United States Patent Office 3,562,182
Patented Feb. 9, 1971

3,562,182
CATALYST WHICH CAN BE USED IN THE POLYMERIZATION OF EPIHALOHYDRINS
Henry L. Hsieh, Bartlesville, Okla., and Francis X. Mueller, Jr., Louisville, Ky., assignors to Phillips Petroleum Company, a corporation of Delaware
No Drawing. Original application Feb. 23, 1968, Ser. No. 707,455, now Patent No. 3,457,197, dated July 22, 1969. Divided and this application Apr. 1, 1969, Ser. No. 812,413
Int. Cl. C08d 1/14
U.S. Cl. 252—431   2 Claims

ABSTRACT OF THE DISCLOSURE

A catalyst formed by contacting (a) an organoaluminum compound such as triisobutylaluminum, (b) an organozinc compound such as diethylzinc, (c) a chelating agent such as acetylacetone, and (d) water. This catalyst has been found useful in the polymerization of epihalohydrins and in the copolymerization of epihalohydrins with other oxirane compounds.

---

Thi application is a divisional of patent application Ser. No. 707,455 filed Feb. 23, 1968 now U.S. Pat. 3,457,197 issued on July 22, 1969.

This invention relates to polymerization of epihalohydrins. One aspect of this invention relates to novel catalyst systems for polymerizing epihalohydrins. In another aspect, this invention relates to a process for polymerizing epihalohydrins whereby a substantial increase in the polymerization rate is obtained.

The polymerization of vicinal epoxide compounds with a variety of catalyst systems is well-known. Organometallic catalyst systems, such as organoaluminum compounds and water, with or without complexing agents, and organozinc compounds and water have been used. Commonly assigned, copending application, Ser. No. 462,104, filed June 7, 1967 now U.S. Pat. 3,379,660 issued on Apr. 23, 1968, discloses a catalyst system comprising an organolithium compound, an organozinc compound, and water for polymerizing vicinal epoxide compounds.

We have found that a substantial increase in the polymerization rate of epihalohydrins can be obtained by polymerizing same in the presence of a catalyst system comprising an organoaluminum compound, an organozinc compound, a chelating agent and water. Also, these catalyst systems have been found to be effective for a copolymerization of epihalohydrins with other oxirane compounds as well as the polymerization of epihalohydrins.

Accordingly, an object of this invention is to provide an improved process for polymerizing epihalohydrins.

Another object of this invention is to provide a novel catalyst system for polymerizing epihalohydrins.

Another object of this invention is to provide a process for polymerizing epihalohydrins which produces a rubbery polymer having good flexibility.

A further object of this invention is to provide a process for polymerizing epihalohydrins having increased polymerization rates.

A still further object of this invention is to provide a process for copolymerizing epichlorohydrins with other oxirane compounds.

Other objects and aspects of this invention will become apparent to those skilled in the art from the following detailed description and appended claims.

According to this invention, at least one epihalohydrin is polymerized or copolymerized with at least one oxirane compound by contacting the monomers with a catalyst system formed by mixing (a) an organoaluminum compound, (b) an organozinc compound, (c) a chelating agent, and (d) water. The polymers produced in accordance with this invention are rubbery, exhibit good low temperature flexibility and are particularly resistant to the effects of heat and ozone.

The epihalohydrins that can be employed in this invention can be represented by the formula:

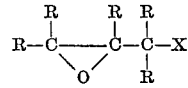

wherein R is hydrogen, alkyl, alkenyl, alkynyl, cycloalkyl, or cycloalkenyl radicals containing 1 through 8 carbon atoms or aryl radical containing 6 through 10 carbon atoms or combinations such as alkaryl, alkenylcycloalkyl and the like, with the total number of carbon atoms in said epihalohydrin being 30 or less, and X is chlorine, bromine, iodine, or fluorine.

Representative examples of epihalohydrins which can be used include 1-chloro-2,3-epoxypropane (epichlorohydrin);
1-bromo-2,3-epoxypropane;
1,5-dichloro-2,3-epoxypentane;
3-iodo-1,2-epoxybutane;
1-chloro-2,3-epoxyundecane;
1-chloro-2,3-diphenyl-2,3-epoxybutane;
1,2-epoxy-3-chloro-3-methylundecane;
2-bromo-2-methyl-3,4-epoxyhexane;
1,3-diphenyl-3-iodo-1,2-epoxybutane;
1-(α-naphthyl)-3-fluoro-1,2-epoxypropane;
2,3,4-trimethyl-4-iodo-2,3-epoxypentane;
2-bromo-3,4-epoxy-6-heptyne;
1,2-di(1-cyclohexenyl)-3-iodo-1,2-epoxypropane;
3-chloro-3-phenyl-1,2-epoxy-5-hexene;
1,3-dicyclohexyl-3-bromo-1,2-epoxypentane;
3-fluoro-3-phenyl-2-cyclopentyl-1,2-epoxybutane;
5,6-di-n-octyl-4-chloro-5,6-epoxytetradecane and the like.

The oxiranes which can be copolymerized with the above epihalohydrins in the practice of this invention are represented by the formula:

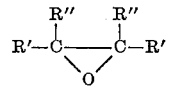

where R and R″ are selected from the group consisting of hydrogen, alkyl, cycloalkyl, alkenyl, alkadienyl, cycloalkenyl, cycloalkadienyl, and aryl radicals and combinations of these, such as aralkyl, alkaryl, and the like. Some or all of the R′ and R″ radicals can be halogen-substituted, and can contain oxygen in the form of an acyclic ether linkage (—O—) or another oxirane group

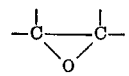

Further, the oxirane compounds represented by the above formula can contain one or two olefinic linkages, one or two oxirane groups, and up to one ether linkage. In addition, the two R″ radicals in the above formula, taken together with the carbon atoms of the oxirane group, can form a cycloaliphatic hydrocarbon nucleus containing from 4 to about 10 carbon atoms, preferably from about 4 to about 8 carbon atoms. The oxirane compounds can contain up to and including 20 carbon atoms per molecule, preferably 2 through 8 carbon atoms per molecule.

Specific examples of some of the oxirane compounds which are within the above structural formula and which can be copolymerized with epihalohydrins in accordance with this invention include ethylene oxide (epoxyethane); 1,2-epoxypropane (propylene oxide); 1,2-epoxybutane; 2, 3-epoxybutane; 1,2-epoxypentane; 2,3-epoxypentane; 1,2-epoxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; styrene oxide; 6-oxabicyclo[3.1.0]hexane; 7-oxabicyclo[4.1.0]heptane; 3-n-propyl - 7 - oxabicyclo[4.1.0]heptane; bis(2,3 - epoxybutyl)ether; tert-butyl 4,5-epoxyhexyl ether; and 2-phenylethyl 3,4-epoxybutyl ether.

Unsaturated oxirane compounds within the above structural formula include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3:7,8-diepoxyoctyl ether; 6-phenyl-3-hexenyl; 3-ethyl-5,6-epoxyhexyl ether; 3,4-epoxy-1-butene (butadiene monoxide); 3,4-epoxy-1-pentene; 5-phenyl-3,4-epoxy-1-pentene; 1,2:9,10 - diepoxy-5-decene; 6,7,-di-n-butyl-3,4:9,10 - diepoxy - 1,11 - dodecadiene; epoxyethyl vinyl ether; allyl 2-methyl-2,3-epoxypropyl ether; 3-cyclohexyl - 2 - propenyl 4-cyclohexyl-3,4-epoxybutyl ether; 2,4-pentadienyl 2,3-diethyl-3,4 - epoxybutyl ether; 1-methallyl 6-phenyl-3,4-epoxyhexyl ether; 5-(4-tolyl)2,3-epoxypentyl vinyl ether; bis[4(3-cyclopentenyl)-2,3-epoxybutyl] ether; 2-(2,4-cyclohexadienyl) ethyl 2,3-epoxybutyl ether; 2-(2,5-cyclohexadienyl)ethyl 2-benzyl-4,5-epoxypentyl ether; 3,4-epoxy-1,5-hexadienyl isopropyl ether; allyl 3,4-dimethyl-3,4-epoxyhexyl ether; 3,4-epoxy-4-(2,3-dimethylphenyl) 1-butene; 3,4-dimethyl-3,4-epoxy-1-pentene; 5-(4-methylcyclohexyl)3,4 - epoxy-1-pentene; 4,5-diethyl-4,5-epoxy-2,6-octadiene; 4 - (2-4-cyclopentadienyl)-1,2:6,7-di-epoxyheptane; and 1-phenyl-1,2,-epoxy-5,7-octadiene.

The catalyst system of this invention is formed by mixing an organoaluminum compound, an organozinc compound, a chelating agent and water. Since the preparation of the catalyst forms no part of this invention, the catalyst can be prepared by any well-known technique.

The organoaluminum compound is represented by the formula $$R'''_n AlX_m$$

wherein R''' is a hydrocarbon radical selected from the group consisting of alkyl, cycloalkyl, and aryl containing from 1 through 20 carbon atoms, and combinations such as alkaryl, aralkyl, and the like; X is a member of the group consisting of hydrogen, fluorine, chlorine, bromine, and iodine; n is an integer of from 1 through 3; m is an integer of from 0 through 2; and the sum of the integers n and m equals 3. Organoaluminum compounds within the above formula include triorganoaluminum compounds, organoaluminum monohalides, organoaluminum monohydrides, organoaluminum dihalides, organoaluminum dihydrides, and organoaluminum sesquihalides. The organoaluminum sesquihalides as herein defined are intended to mean a mixture of organoaluminum monohalides and organoaluminum dihalides of the formulas $R'''_2AlX$ and $R'''AlX_2$, wherein R''' is the same as hereinbefore defined with respect to the general formula and X is a halogen. The organoaluminum sesquihalides can then be written as $R'''_3Al_2X_3$. Exemplary organoaluminum compounds within the above formula include trimethylaluminum, triethylaluminum, tri-n-butylaluminum, triisobutylaluminum, tri - n - hexylaluminum, tri-n-decylaluminum, tri-n-eicosylaluminum, tricyclohexylaluminum, triphenylaluminuf, methyldiphenylaluminum, ethyldi (3,5-di - n - heptylphenyl)aluminum, tribenzylaluminum, tri - 1 - naphthylaluminum, di-n-octylphenylaluminum, tri-4-tolylaluminum, dimethylchloroaluminum, methyldichloroaluminum, n-heptyldifluoroaluminum, (3-ethylcyclopentyl)diiodoaluminum, methylisobutylchloroaluminum, diphenylbromoaldmindm, dibenzylchloroaluminum, di-n-octylchloroaluminum, n - octaylphenylchloroaluminum, di - n - eicosyliodoaluminum, n-butyldihydroaluminum, methyldihydroaluminum, diisopropylhydroaluminum, ethylmethylhydroaluminum, diphenylhydroaluminum, benzyl - n - dodecylhydroaluminum, dicyclohexylhydroaluminum, 2,6-di-n-butyl - 4 - n - hexylphenyldihydroaluminum, and n-amylethylhydroaluminum.

The organozinc portion of the catalyst system can be represented by the formula $$R^{iv}_t ZnY_u$$

wherein $R^{iv}$ is a hydrocarbon radical selected from the group consisting of alkyl, cycloalkyl, and aryl containing from 1 through 20 carbon atoms, and combinations such as aralkyl, alkaryl, and the like; Y is a member of the class consisting of hydrogen, fluorine, chlorine, bromine, and iodine; t is an integer of from 1 through 2; u is an integer of from 0 through 1; and the sum of the integers t and u equals 2. Organozinc compounds within the above formula include diorganozinc compounds, organozinc monohalides, and organozinc monohydrides. Exemplary organozinc compounds within the above general formula include dimethylzinc; diethylzinc; di-n-propylzinc; diisopropylzinc; di-n-butylzinc; diisobutylzinc; di-n-amylzinc; di-n-hexylzinc; di-n-octylzinc; di-n-dodecylzinc; dicyclopentylzinc; dicyclohexylzinc; bis(2,5 - dimethylcyclopetyl)zinc; bis(3,5 - dimethylcyclohexyl)zinc; diphenylpetyl)zinc; bis(2 - n - hexyltetradecyl)zinc; bis(4-cyclohexyloctyl)zinc; bis(2 - n - butylcyclohexyl)zinc; bis(2,4,8-trimethylhendecyl)zinc; bis(7 - n - pentyltetradecyl)zinc; bis[2 - (2,3,5 - tri - n - butylphenyl)ethyl]zinc; dibenzylzinc; bis(4,6 - dicyclopentyldecyl)zinc; methylethylzinc; ethylisopropylzinc; n - propyl - n - hexylzinc; methylchlorozinc; ethylbromozinc; n-propylchlorozinc; n-amylbromozinc; n - hexyliodozinc; n - octylchlorozinc; cyclopentylchlorozinc; cyclohexylbromozinc; 2 - n - hexyltetradecylchlorozinc; 7 - n - pentyltetradecylbromozinc; benzylbromozinc; 4,6 - dicyclopentyldecylbromozinc; n-dodecylfluorozinc; 3,5 - dimethylcyclohexylchlorozinc; cyclohexyliodozinc; methylhydrozinc; cyclohexylhydrozinc; n-eicosylhydrozinc; 4 - tolylhydrozinc; and n-amylhydrozinc.

It is within the scope of this invention to employ two or more organozinc compounds or two or more organoaluminum compounds at the same time to form the catalyst. Similarly, two or more organozinc compounds can be used with one organoaluminum compound or two or more organoaluminum compounds can be used with one organozinc compound to form the catalyst of this invention.

The chelating agent used in this invention is an organic compound capable of forming a ring by coordination with its unshared electrons and the aluminum atom of the organoaluminum compound. Beta-diketones are the presently preferred chelating agents. Other acceptable chelating agents are characterized by two functional groups, one being an —OH or —SH group and the other containing an oxygen, nitrogen or sulfur atom that forms a coordinate bond with aluminum, such as carbonyl, ester, carboxyl, sulfoxide, sulfone, nitroso, nitro, amino, thiocarbonyl, thiocarboxylic and thioester groups.

Representative examples of chelating agents that can be used in this invention include beta-diketones represented by the formula:

$$R^v-\underset{\underset{O}{\|}}{C}-CH_2-\underset{\underset{O}{\|}}{C}-R^v$$

wherein $R^v$ is a hydrocarbon radical selected from the group consisting of alkyl, cycloalkyl, or aryl, or combination thereof, containing 1 through 10 carbon atoms such as 2,4-pentanedione (acetylacetone); 3,5-heptanedione; 11,13 - tricosanedione; 1,3 - dicyclohexyl - 1,3, - propanedione; 1,5 - dicyclopentyl-2,4-pentanedione; 1,3-diphenyl-1,3,propanedione; 1,5-diphenyl - 2,4 - pentanedione; 2,8-dimethyl - 4,6 - nonanedione; 1,3-di(4-n-butylphenyl)-1,3-propanedione; 1,11 - diphenyl - 5,7-hendecanedione; 1-phenyl - 1,3 - butanedione; 2,4-decanedione; and 1-(3,5-dimethylcyclohexyl)2,4 - pentanedione; ketomonocarboxylic acids and esters thereof, such as acetoacetic acid and ethyl acetoacetate; ketoaldehydes such as formylacetone; hydroxyketones such as hydroxyethyl methyl ketone, hydroxyacetone, O-hydroxyacetophenone, and 2,5-dihydroxy-p-benzoquinone; hydroxyaldehydes such as salicylaldehyde; ester of hydroxy monocarboxylic acids such as ethyl glycolate; hydroxyalkyl monocarboxylates such as 2-hydroxyethyl acetate; dicarboxylic acids and esters thereof such as oxalic, and malonic acid; dialdehydes such as malonaldehyde; alkoxy monocarboxylic acids such as ethoxy acetic acid; ketooximes such as 2,3-butanedione-monooxime; aldooximes such as glyoxal monooxime; hydroxamic acids such as N-phenyl benzohydroxamic acid; dioximes such as dimethyl glyoxime; amino alcohols such as ethanol amine and diethylaminoethanol; ketoimides such as acetyl acetone mono-imide; and mercaptothiazoles.

The water used as a fourth component in a novel catalyst system of this invention cooperates with the other components in the catalyst to produce high molecular weight rubber polymers. Although it is not known for certain just how the water functions, the data show that when water is employed, high molecular weight rubbery polymers are produced.

The amount of catalyst used for effecting polymerization of epihalohydrins and copolymerization of epihalohydrins and oxirane compounds can be varied over a rather broad range. For convenience, the catalyst level is based on the total quantity of organometallic components, i.e., the organoaluminum and organozinc compounds. Generally, the total amount of organoaluminum and organozinc compounds employed is in the range of about 1 to about 100 gram millimoles per 100 grams of monomer or monomers. The preferred range is from about 5 to about 40 gram millimoles of total organometallic compounds per 100 grams of monomer or monomers.

The mole ratio of organoaluminum to organozinc compound is in the range of about 1.5:1 to about 30:1, preferably in the range of 2:1 to 10:1. The mole ratio of total organic metallic compounds to chelating agent is in the range of about 1:1 to about 20:1, preferably in the range of 3:1 to 10:1. The mole ratio of total organometallic compounds to water is in the range of about 0.5:1 to about 4:1, preferably in the range of 1:1 to 2:1.

The polymerization reaction of this invention can be carried out either as a batch process or as a continuous process with the novel catalyst system being added in a single initial charge or in predetermined increments during polymerization. Similarly, the monomers may be introduced into the reaction zone in one charge or they can be added gradually during polymerization. In order to expedite and improve the efficiency of the polymerization reaction it is preferred that an inert diluent be used. Suitable diluents which can be used for this purpose include paraffinic, cycloparaffinic, and aromatic hydrocarbons containing from about 4 to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent employed is largely a matter of choice, it is obviously possible to employ other diluents than those herein identified without departing from the spirit and scope of the invention. Mixtures of suitable hydrocarbons can also be employed as diluents. It is also within the scope of this invention to employ ethers as diluents, either alone or in admixture with one or more hydrocarbons or halogenated hydrocarbons. It has been found that ethers generally provide an additional promoting effect on the polymerization.

The temperature and pressure at which the polymerization is effected can vary over a rather wide range. Generally, the polymerization is conducted at a temperature within the range of about 40 to about 250° F., preferably within the range of 85 to 200° F. The polymerization can be conducted at pressures over a wide range but usually is conducted at a pressure which will maintain at least a portion of the materials in the liquid state; however, super-atmospheric pressures can be used if desired.

The duration of the polymerization reaction will depend primarily upon the temperature, pressure, and activity of the specific catalyst system used. Normally, this time will vary in the range from a few minutes to 100 hours or more. A preferred range is about 10 minutes to 50 hours.

The polymers produced in accordance with this invention are rubbery and exhibit extremely good low temperature flexibility. They are particularly resistant to the effects of seat and ozone. These polymers can be vulcanized with certain types of cross-linking agents, such as polyamines, to produce products which are resistant to swelling in hydrocarbons and chlorinated hydrocarbons. These rubbery polymers have good building tack and give low heat build-up on flexing so have utility in the specialty rubbery field such as for fabricating articles like motor mounts, auto body mounts, auto suspension system parts, hoses, tubing, and the like.

The following examples are presented to illustrate this invention and are not to be construed as unduly limiting same thereto.

EXAMPLE I

Two series of runs were conducted where epichlorohydrin was polymerized by means of a catalyst system containing acetylacetone and water, with and without an organozinc compound (diethylzinc) and an organoaluminum compound (triisobutyl aluminum), to illustrate the effect of the inclusion of these organometallic compounds on monomer conversion. The total amount of the organometallic portion of the catalyst system, i.e. triisobutyl aluminum and diethylzinc, or mixtures of these compounds, and the amount of acetylacetone were kept constant. The ratio of triisobutyl aluminum to diethylzinc was varied and the amount of water was different in each series. The materials were charged to a reactor with the following proportions and operating condtions:

| | |
|---|---:|
| Epichlorohydrin, parts by weight | 100 |
| Toluene, parts by weight | 860 |
| Triisobutylaluminum (TBA), mhm.[1] | Variable |
| Diethylzinc (DEZ), mhm. | Variable |
| Water, mhm. | Variable |
| Acetylacetone, mhm. | 4 |
| Temperature, ° F. | 158 |
| Time, hours | 4 |

[1] Mhm.=Gram millimole per 100 grams monomer.

The polymerization technique employed involved the steps of charging the reactor with toluene and thereafter purging with nitrogen. Diethylzinc, when used, was then charged to the reactor followed by the acetylacetone. This mixture was allowed to stand for 45 minutes at a temperature of approximately 75° F. after which the triisobutylaluminum, when used, was charged to the reactor followed by the water and the epichlorohydrin monomer. The reaction temperature was adjusted to 150° F. and maintained at this level for four hours. At the conclusion of each run, approximately two parts by weight of 2,2'-methylene-bis(4-methyl-6-tert-butylphenol) antioxidant was added as a 10 weight percent solution in a mixture of equal parts by volume of isopropyl alcohol and toluene. The reaction product was coagulated in isopropyl alcohol, separated and dried. The resultant polymer from all these runs was rubbery. Table I below presents the results of each of these runs:

These data show that, even through the charging procedure was varied, the presence of diethylzinc in the catalyst system increased the conversion rate.

TABLE I

| Run Number: | TBA, mhm. | DEZ, mhm. | H₂O, mhm. | Acac, mhm. | TBA:DEZ, mole ratio | Total organometal:H₂O, mole ratio | Total organo-metal: acac, mole ratio | Monomer conversion,[1] percent |
|---|---|---|---|---|---|---|---|---|
| 1 | 20 | 0 | 10 | 4 | --- | 2:1 | 5:1 | 50 |
| 2 | 18 | 2 | 10 | 4 | 9:1 | 2:1 | 5:1 | 56 |
| 3 | 16 | 4 | 10 | 4 | 4:1 | 2:1 | 5:1 | 60 |
| 4 | 14 | 6 | 10 | 4 | 2.33:1 | 2:1 | 5:1 | 65 |
| 5 | 10 | 10 | 10 | 4 | 1:1 | 2:1 | 5:1 | 30 |
| 6 | 0 | 20 | 10 | 4 | --- | 2:1 | 5:1 | 2 |
| 7 | 20 | 0 | 15 | 4 | --- | 1.33:1 | 5:1 | 69 |
| 8 | 18 | 2 | 15 | 4 | 9:1 | 1.33:1 | 5:1 | 89 |
| 9 | 16 | 4 | 15 | 4 | 4:1 | 1.33:1 | 5:1 | 88 |
| 10 | 10 | 10 | 15 | 4 | 1:1 | 1.33:1 | 5:1 | 6 |
| 11 | 0 | 20 | 15 | 4 | --- | 1.33:1 | 5:1 | 3 |

[1] Weight percent of the monomer charged converted to polymer; mhm.=gram millimoles per 100 grams monomer; TBA=triisobutylaluminum; DEZ=diethylzinc; Acac=acetylacetone.

From these data it can be seen that when diethylzinc was used alone as the organometallic component in the catalyst system (Runs 7 and 11), very little polymer was obtained. It can also be seen that with a TBA:DEZ mole ratio of 2.33:1 and higher, a higher conversion rate was obtained when both an organo-aluminum and an organozinc compound was used in the catalyst system.

EXAMPLE II

A series of runs was conducted where epichlorohydrin was polymerized with a catalyst system employing constant amounts of water, acetylacetone, and total organometallic compounds and varying triisobutylaluminum to diethylzinc mole ratios. The portions of epichlorohydrin, acetylacetone and toluene were identical to that used in Example I but the polymerization technique was different. In this series of runs toluene was charged to the reactor first. The reactor was subsequently purged with nitrogen and then the triisobutylaluminum was added followed by the diethylzinc, the acetylacetone, the water and epichlorohydrin monomer. After all the ingredients were charged to the reactor, the temperature was adjusted to 158° F. and maintained at this level for 4 hours. Rubbery polymer was recovered from each run in the same manner as in Example I. Table II below presents the results of each of these runs:

EXAMPLE III

Two pairs of runs were conducted where epichlorohydrin was polymerized to illustrate the effect of the inclusion of diethylzinc in a catalyst system containing triisobutylaluminum, acetylacetone, and water. In each run 100 parts by weight of eipichlorohydrin and 860 parts by weight of toluene were used and the charging procedure was the same as in Example I. The reaction temperature was adjusted to 158° F. and maintained at that level for 4 hours, 10 minutes. Rubbery polymer was recovered from each run in the same manner as in Example I. Table III below presents the results of each of these runs.

TABLE III

| Run Number: | TBA, mhm. | DEZ, mhm. | H₂O, mhm. | Acac, mhm. | TBA:DEZ, mole ratio | Total organometal:H₂O, mole ratio | Total organo-metal: acac, mole ratio | Monomer conversion,[1] percent |
|---|---|---|---|---|---|---|---|---|
| 1 | 25 | 0 | 16 | 4 | --- | 1.56:1 | 6.25:1 | 61 |
| 2 | 20 | 2 | 16 | 4 | 10:1 | 1.37:1 | 5.5:1 | 85 |
| 3 | 25 | 0 | 20 | 4 | --- | 1.25:1 | 6.25:1 | 59 |
| 4 | 20 | 2 | 20 | 4 | 10:1 | 1.10:1 | 5.5:1 | 93 |

[1] Note.—See footnote, Table I.

These data show that diethylzinc gives a substantial increase in the conversion rate over a polymerization reaction when the diethylzinc component was not present (Runs 1 and 3). The data also show that when an organozinc compound is used in conjunction with an organoaluminum compound, a higher conversion is obtained with a lower catalyst level, i.e. smaller total quantity of the organometallic compounds, than when an organoaluminum compound is used alone.

EXAMPLE IV

A series of runs whereby epichlorohydrin was polymerized was conducted to illustrate the effect of the inclusion of acetylacetone in a catalyst system containing tri-

TABLE II

| Run Number: | TBA, mhm. | DEZ, mhm. | H₂O, mhm. | Acac, mhm. | TBA:DEZ, mole ratio | Total organometal:H₂O, mole ratio | Total organo-metal: acac, mole ratio | Monomer conversion,[1] percent |
|---|---|---|---|---|---|---|---|---|
| 1 | 20 | 0 | 15 | 4 | --- | 1.33:1 | 5:1 | 58 |
| 2 | 18 | 2 | 15 | 4 | 9:1 | 1.33:1 | 5:1 | 80 |
| 3 | 16 | 4 | 15 | 4 | 4:1 | 1.33:1 | 5:1 | 72 |
| 4 | 10 | 10 | 15 | 4 | 1:1 | 1.33:1 | 5:1 | 4 |
| 5 | 0 | 20 | 15 | 4 | --- | 1.33:1 | 5:1 | 3 |

[1] Note.—See footnote, Table I.

isobutylaluminum, diethylzinc, and water. In each run 100 parts by weight of epichlorohydrin and 860 parts by weight of toluene were used and the charging was the same as in Example I. The reaction temperature was adjusted to 158° F. and maintained at that level for 4 hours, 10 minutes. Rubbery polymer was recovered from each run in the same manner as in Example I. Table IV below presents the results of each of these runs.

TABLE IV

| | TBA, mhm. | DEZ, mhm. | $H_2O$, mhm. | Acac, mhm. | TBA:DEZ, mole ratio | Total organo-metal:$H_2O$, mole ratio | Total organo-metal: acac, mole ratio | Monomer conversion,[1] percent |
|---|---|---|---|---|---|---|---|---|
| Run Number: | | | | | | | | |
| 1 | 20 | 2 | 16 | 0 | 10:1 | 1.37:1 | | 37 |
| 2 | 20 | 2 | 16 | 4 | 10:1 | 1.37:1 | 5.5:1 | 85 |
| 3 | 20 | 2 | 20 | 0 | 10:1 | 1.1:1 | | 48 |
| 4 | 20 | 2 | 20 | 4 | 10:1 | 1.1:1 | 5.5:1 | 93 |

[1] NOTE.—See footnote, Table I.

These data show the unexpected increase in conversion rate when all four of the catalyst components of this invention are present.

EXAMPLE V

Three runs were conducted to illustrate the effect of the polymerization of epichlorohydrin with a catalyst system in accordance with this invention in the presence of an ether. One hundred parts by weight of epichlorohydrin and 860 parts by weight of toluene were used and the charging procedure was the same as in Example I. One run containing only the hydrocarbon diluent was used as a control. Different quantities of diethylether were added to the other two runs. Reaction temperature was adjusted to 158° F. and maintained at that level for six hours. Rubbery polymer was recovered from each run in the same maner as in Example I. Table V below illustrates the results of each of these runs:

TABLE V

| | TBA, mhm. | DEZ, mhm. | $H_2O$, mhm. | Acac, mhm. | Diethyl ether, phm. | Monomer conversion, percent |
|---|---|---|---|---|---|---|
| Run No.: | | | | | | |
| 1 | 15 | 2 | 12 | 4 | 0 | 64 |
| 2 | 15 | 2 | 12 | 4 | 36 | 78 |
| 3 | 15 | 2 | 12 | 4 | 113 | 93 |

NOTE.—phm.=Parts by weight per 100 parts by weight of monomer.

These data show that the conversion with a catalyst system in accordance with this invention can be increased even further when an ether is present during the polymerization.

EXAMPLE VI

Two runs were conducted whereby epichlorohydrin and propylene oxide were copolymerized. The charging procedure was the same as in Example I with the propylene oxide being charged last. These materials were charged to a reactor with the following proportions and operating conditions:

| | 1 | 2 |
|---|---|---|
| Epichlorohydrin, parts by weight | 70 | 70 |
| Propylene oxide, parts by weight | 30 | 30 |
| Toluene, parts by weight | 860 | 860 |
| Triisobutylaluminum, mhm | 25 | 20 |
| Diethylzinc, mhm | 0 | 4 |
| Water, mhm | 16 | 16 |
| Acetylacetone, mhm | 8 | 8 |
| Temperature, ° F | 158 | 158 |
| Time, hours | 6 | 6 |

A rubbery polymer was recovered from each run by evaporation of the diluent. Table VI below presents the results of each of these runs:

TABLE VI

| | TBA:DEZ, mole ratio | Total organo-metal:$H_2O$, mole ratio | Total organo-metal:Acac, mole ratio | Conversion, percent |
|---|---|---|---|---|
| Run No.: | | | | |
| 1 | | 1.56:1 | 3.1:1 | 30 |
| 2 | 5:1 | 1.5:1 | 3:1 | 40 |

These data show that the rate of the copolymerization reaction of an epihalohydrin and an oxirane compound is higher with the 4-component catalyst system of this invention than when no organozinc compound is used.

Although the invention has been described in considerable detail, it must be understood that such detail is for the purposes of illlustration only and that many variations and modifications can be made by one skilled in the art without departing from the scope and spirit thereof.

We claim:
1. A catalyst system formed upon mixing:
(a) at least one organoaluminum compound represented by the formula

$$R'''_n AlX_m$$

wherein each $R'''$ is a hydrocarbon radical selected from the group consisting of alkyl, cycloalkyl, aryl and combinations thereof; containing from 1 through 20 carbon atoms, Y is selected from the group consistsisting of hydrogen, fluorine, chlorine, bromine, and iodine; $n$ is an integer of from 1 through 3; $m$ is an integer of from 0 through 2; and the sum of the integers $n$ and $m$ equals 3;
(b) at least one organozinc compound represented by the formula $$R^{iv}_t Zn Y_u$$

wherein each $R^{iv}$ is a hydrocarbon radical selected from the group consisting of alkyl, cycloalkyl, aryl and combinations thereof; containing from 1 through 20 carbon atoms, Y is selected from the group consisting of hydrogen, fluorine, chlorine, bromine, and iodine; $t$ is an integer of from 1 through 2; $u$ is an integer of from 0 through 1; and the sum of the integers $t$ and $u$ equals 2;
(c) at least one chelating agent selected from beta-diketones represented by the formula:

$$R^v - \underset{\underset{O}{\|}}{C} - CH_2 - \underset{\underset{O}{\|}}{C} - R^v$$

wherein $R^v$ is a hydrocarbon radical selected from the group consisting of alkyl, cycloalkyl, aryl and combinations thereof, containing 1 through 10 carbon atoms, and
(d) water wherein the mole ratio of said organoaluminum compound to said organozinc compound is within the range of about 1.5:1 to about 30:1, the mole ratio of the total amount of said organoaluminum and said organozinc compounds to said chelating agent is within the range of about 1:1 to about 20:1 and the mole ratio of the total amount of said organoaluminum and said organozinc compounds to said water is within the range of about 0.5:1 to about 4:1.

2. The catalyst system of claim 1 wherein said organoaluminum compound is triisobutylaluminum, said organozinc compound is diethylzinc and said chelating agent is acetylacetone.

References Cited

UNITED STATES PATENTS

| | | | |
|---|---|---|---|
| 3,135,706 | 6/1964 | Vandenberg | 252—431X |
| 3,158,581 | 11/1964 | Vandenberg | 252—431X |
| 3,379,660 | 4/1968 | Hsieh | 252—431X |

PATRICK P. GARVIN, Primary Examiner

U.S. Cl. X.R.

260—2, 88.3